Patented Mar. 27, 1928.

1,664,275

UNITED STATES PATENT OFFICE.

FRIEDRICH HERMANN WEIL, OF KREUZNACH, GERMANY, ASSIGNOR TO SEITZ-WERKE G. M. B. H., OF KREUZNACH, GERMANY, A CORPORATION.

METHOD OF PREPARING FILTERING MATERIALS.

No Drawing. Application filed February 24, 1927, Serial No. 170,729, and in Germany May 22, 1924.

My invention relates to an improved method of preparing filtering materials.

The object of my invention is the production of a filtering material from natural asbestos which will be durable and efficient without possessing any objectionable properties.

Natural asbestos is an efficacious filtering material but not adapted for all purposes, for the reason, that certain constituents thereof are objectionable or incompatible with the filtering purpose. These objectionable constituents consist chiefly of incidental substances or ingredients having an alkaline reaction and present in the asbestos mineral either as the result of weathering phenomena, or of infiltration, etc. Hitherto it has been customary to dissolve such objectionable constituents by treating the natural asbestos mass with suitable chemicals and to remove the dissolved constituents by lixiviation or in any other appropriate manner.

Asbestos products thus obtained, however, are objectionable for the reason that the consistency and the size of the pores of the asbestos substance are detrimentally influenced by the treatment of the latter with reacting and leaching liquids.

According to the present invention I treat the fibrous asbestos material with certain gases or vapors of basic or acid nature, preferably under pressure, and I apply a pressure selected in conformity with or depending upon the density of the asbestos mass under treatment. In this way all of those ingredients or constituents of the asbestos which are present therein, either mechanically mixed or chemically combined therewith, and which are detrimental to filtration, are rendered innocuous or inert with relation to the liquid to be filtered, so that the asbestos substance thus treated and prepared will be chemically inert to the liquid to be filtered. As stated above, these objectionable constituents consist chiefly of substances or ingredients having an alkaline reaction and present in the asbestos mineral either as the result of weathering phenomena, or of infiltration, etc.; for instance, in most deposits of asbestos weathering will produce magnesia (MgO), which has an alkaline reaction detrimental, in some cases, to the properties of the liquid for the filtration of which the purified asbestos is to be used. It will be seen that by the use of a gaseous reacting fluid the objectionable influences on the physical properties of the asbestos substance as hitherto experienced, are throughly avoided and an asbestos material will be obtained which is entirely devoid of the defects inherent in the asbestos filtering material hitherto produced and employed.

The reacting agent I employ in preparing the filtering material may consist of any of a variety of active gases. The selection of the proper gas in each case depends upon both the specific character of the natural asbestos to be treated and the nature of the reaction of the liquid to be filtered. Thus, just as the case may be, gases of basic or alkaline reaction and of acid reaction will be utilizable for the purpose in view, and for exemplification I mention caustic ammonia gas, hydrochloric acid gas, carbon dioxid, hydrofluoric acid, and the like. It will be noted that none of these are reducing gases. The gas is used in a dry condition, and the asbestos likewise is in a dry or practically dry condition at the time of its treatment with non-reducing gas; asbestos is not particularly hygroscopic, the amount of moisture which it is capable of absorbing from atmospheric air not being more than 5% as a maximum.

As above intimated, the resulting fibrous asbestos substance is devoid of any objectionable properties and especially the original porosity, smoothness and gloss of the mineral are fully conserved therein.

From the foregoing it is believed that the advantages and novel features of my invention will be readily understood and, therefore, further detailed description is deemed unnecessary the more so since the individual steps or operations of the method are in themselves universally known.

What I claim is:—

1. The method of preparing a filtering material for liquids which comprises treating natural asbestos with a non-reducing gas under pressure which gas unites with the impurities of the natural asbestos and forms compounds therewith which are chemically inert with respect to the liquids to be filtered.

2. The method of preparing a filtering material for liquids which comprises treating natural asbestos fibers with a chemically active gas which gas unites with the impurities of the fibers to form deposits on said fibers, which deposits are chemically inert with respect to the liquids to be filtered.

In testimony that I claim the foregoing as my invention I have signed my name this 14th day of February, 1927.

FRIEDRICH HERMANN WEIL.